United States Patent
Ziemek et al.

[11] 3,722,777
[45] Mar. 27, 1973

[54] APPARATUS FOR MAKING ELECTRICAL HEATING MATS

[75] Inventors: Gerhard Ziemek, 3 Hannover; Friedrich Schatz, 3012 Langenhagen; Karoly Aust, 3 Hannover, all of Germany

[73] Assignee: Kabel-und Metallwerke Gutehoffnungschutte Aktiengesellschaft, Hannover, Germany

[22] Filed: Mar. 15, 1971

[21] Appl. No.: 124,051

[30] Foreign Application Priority Data

Mar. 18, 1970 Germany.................P 20 12 766.6

[52] U.S. Cl. ...............228/4, 29/157.3, 140/112, 228/5, 219/56
[51] Int. Cl.............................................B23c 37/04
[58] Field of Search ....219/528, 56, 80; 140/35, 102, 140/111, 112, 116; 29/157.3; 228/4, 44, 5, 6

[56] References Cited

UNITED STATES PATENTS

| 1,961,991 | 6/1934 | Southwell | 140/112 |
| 2,422,829 | 6/1947 | Foxie | 140/112 X |
| 3,369,575 | 2/1968 | Rosler | 140/112 |
| 3,405,743 | 10/1968 | Robinson | 140/112 |
| 3,460,225 | 8/1969 | Beauvais | 29/157.3 |

*Primary Examiner*—J. Spencer Overholser
*Assistant Examiner*—Robert J. Craig
*Attorney*—Philip G. Hilbert

[57] ABSTRACT

Apparatus for the continuous production of electrical heating mats constituted of a continuous linear electrical heating element looped to form parallel portions together with tapes extending longitudinally of the looped portions of the heating element and arranged to lock the transverse portions of the heating element in spaced relation to each other. Such apparatus includes a looping mechanism for continuously looping the linear heating element as it is fed to the looping mechanism, together with means for controlling the looping mechanism to render the successive loops taut, and means for feeding a pair of tapes longitudinally of the looped element with the tapes on opposite sides thereof and including means for crimping one of the tapes at spaced intervals to receive a portion of the heating element therein and means for securing the tape portions between successive loops of heating element, together.

7 Claims, 7 Drawing Figures

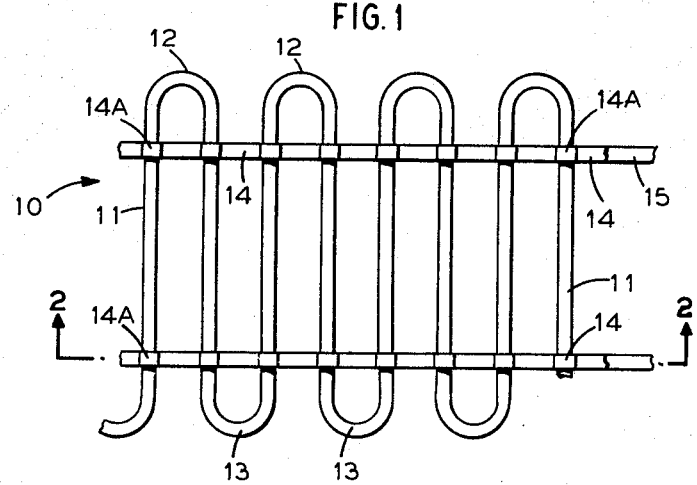
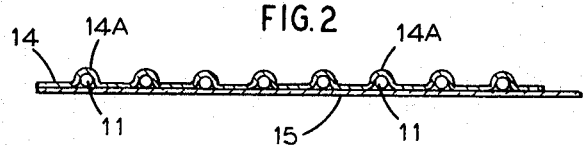
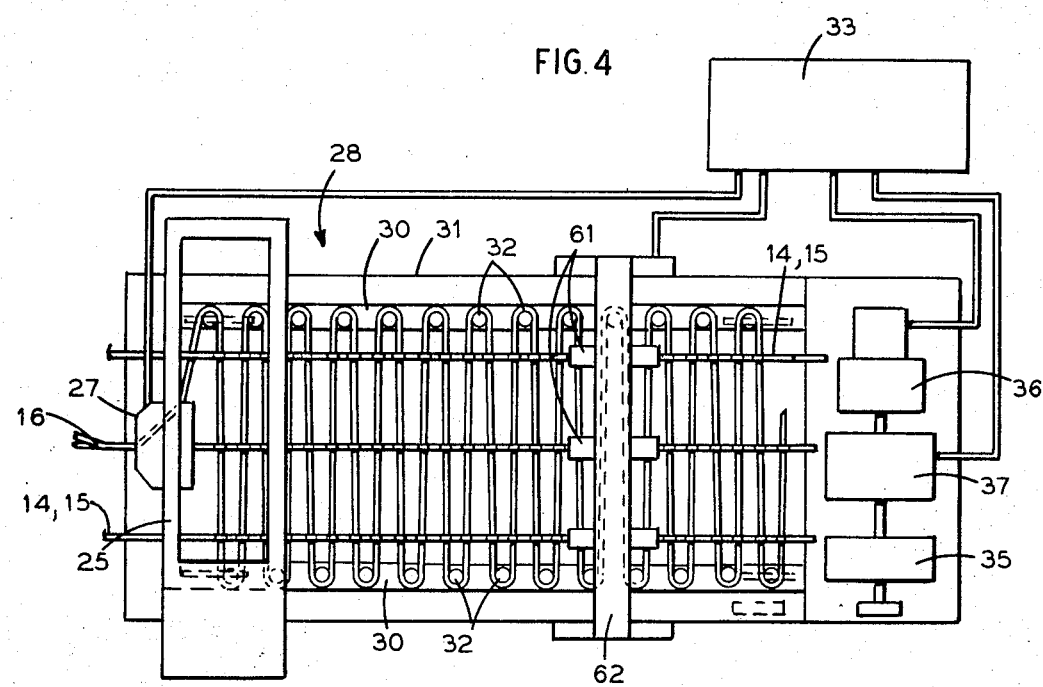
INVENTORS
Gerhard Ziemek
Friedrich Schatz
Karoly Aust

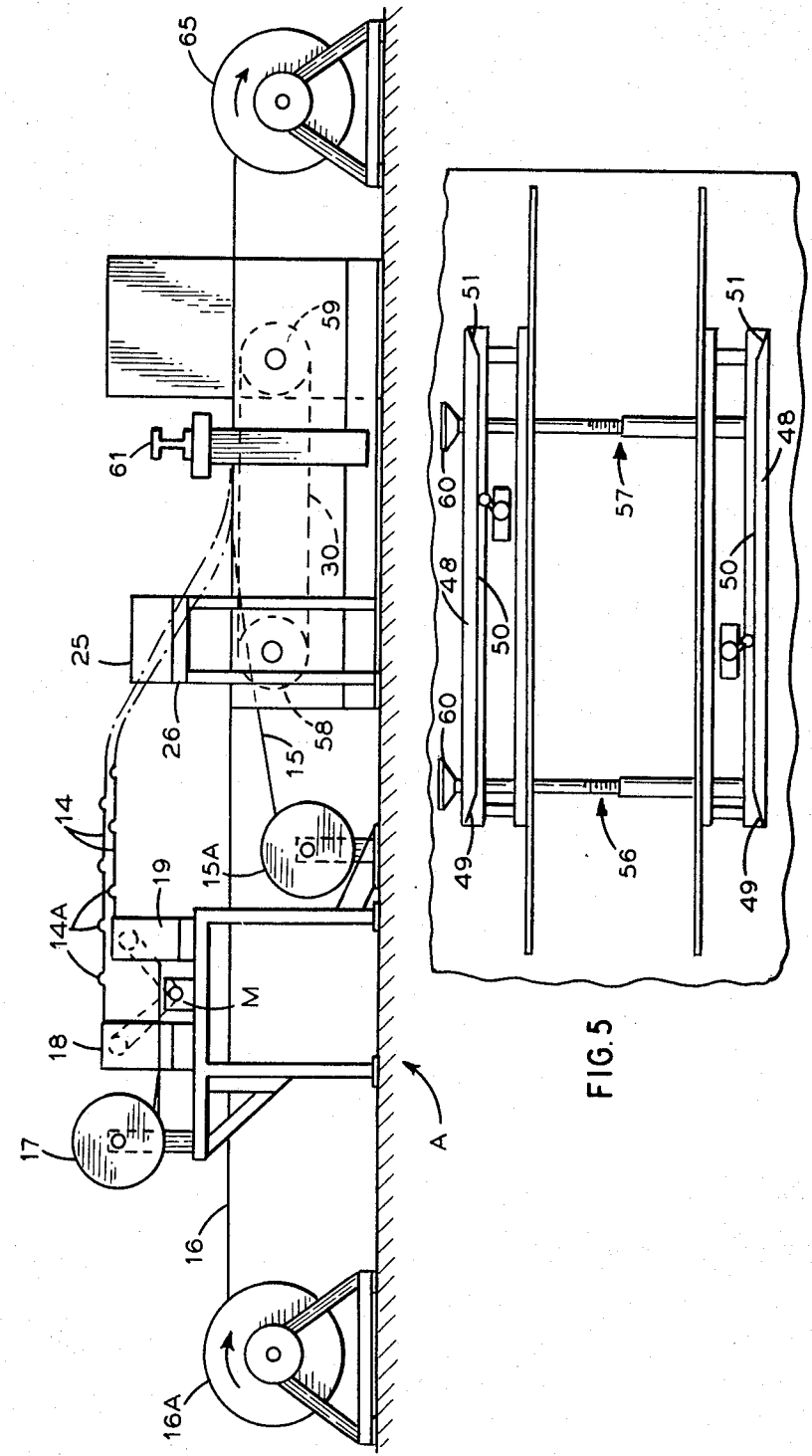

APPARATUS FOR MAKING ELECTRICAL HEATING MATS

BACKGROUND OF THE INVENTION

Electrical heating mats are extensively used for heating homes, garage ramps, bridges and streets. A requirement for such heating mats is that they guarantee uniform heating of the surface which is to be heated. This requires a uniform distribution of the heating elements.

Conventionally, such heating installations involves an in situ deposit of the heating element, which is drawn from drums positioned at the point of installation. The withdrawn element is then distributed in a looped arrangement over the surface area to be heated. This type of installation is not only time consuming so as to maximize labor costs; but also fails to achieve the required uniformity in disposition of the successive looped portions of the heating element.

Accordingly, an object of this invention is to provide apparatus for preforming electrical heating mats wherein, looped portions of the heating element are uniformly disposed and spaced to achieve optimum results from the finished mat.

Another object of this invention is to provide apparatus of the character described, which is adapted to automatically convert continuous electrical element in looped form with parallel portions thereof uniformly spaced and disposed to provide continuous preformed mat of a selected width.

A further object of this invention is to provide apparatus of the character described which is adapted to feed continuous electrical heating element in a manner to loop the same in a common horizontal plane with successive portions thereof in parallel spaced relation, and to also feed metal tape in a path transverse to the parallel portions of the electrical element, together with means for securing pairs of aligned tapes having the element portions disposed therebetween, together in a manner to fix the element portions in their parallel spaced relation.

Still another object of this invention is to provide apparatus of the character described which includes improved means for effecting a looping action in respect to the continuous electrical heating element whereby such element is disposed in a horizontal plane with uniform spacing of parallel portions thereof.

Yet another object of this invention is to provide apparatus of the character described, which includes control means for regulating the spacing between the parallel portions of the electrical heating element and control means for regulating the width of the formed mat.

Still a further object of this invention is to provide apparatus of the character described which includes looping means adapted to tension the loops of the electrical heating element as the loops are being formed.

Other objects of this invention will in part be obvious and in part hereinafter pointed out.

DESCRIPTION OF THE DRAWINGS

FIG. 1 is a plan view of a portion of electrical heating mat formed by the apparatus of the invention;

FIG. 2 is a sectional view taken on the line 2—2 of FIG. 1;

FIG. 3 is a side elevational view of the apparatus embodying the invention;

FIG. 4 is a top plan view of a portion thereof;

FIG. 5 is a plan view showing an adjustable feature of the apparatus;

DESCRIPTION OF THE PREFERRED EMBODIMENT

Figure 6:
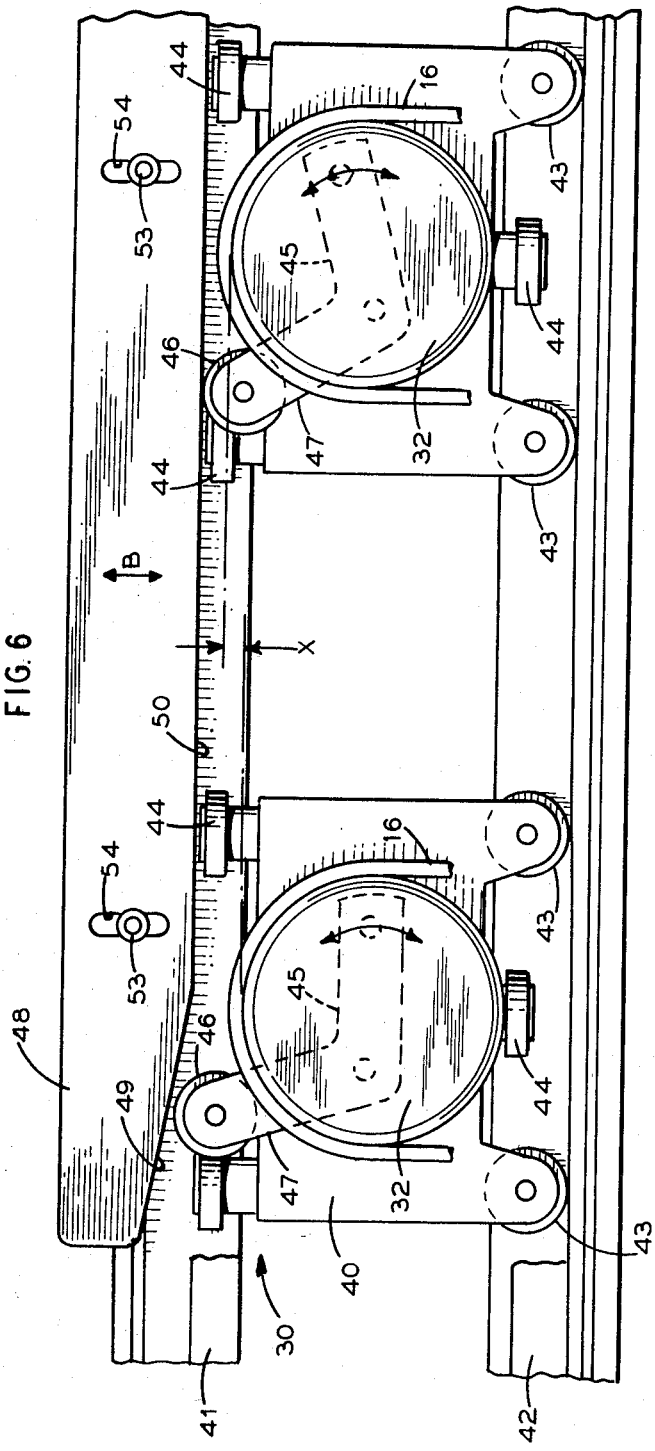
FIG. 6 is a plan view showing details of a portion of the apparatus.

The apparatus of the instant invention is adapted to form in a continuous manner, electrical heating mat having looped heating element with uniform spacing of the parallel portions of the heating element.

Such mat, generally indicated at 10, is shown in FIGS. 1, 2; wherein the looped electrical heating element comprises parallel portions 11 joined by the oppositely disposed looped end portions 12, 13. The parallel portions 11 are secured in their spaced relation by a plurality of pairs of longitudinally extending metal tapes 14, 15. The uppermost tape 14 is formed with spaced recesses 14A to receive the element portions 11 therein and the tapes 14, 15 are suitably secured together as by welding or the like.

The apparatus of the instant invention, generally indicated at A, FIG. 3, comprises a supply drum 16A from which electrical heating element 16 is fed in a longitudinal path. The apparatus further comprises a plurality of laterally related supply drums 17 for feeding metal tape 14 and a corresponding number of supply drums 15A for feeding metal tape 15.

Figure 7:
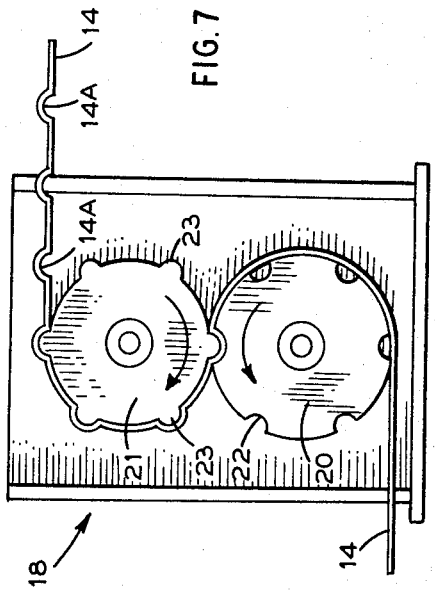
FIG. 7 is a side elevational view showing a portion of the apparatus for grooving metal retaining tapes

Tapes 14 as they are led from drums 17, pass through crimping devices 18, 19 which form spaced recesses 14A, therein. Devices 18, 19 comprise pairs of matching indenting rollers 20, 21 having recesses 22 and mating projections 23, respectively, to thereby form recesses 14A, see FIG. 7. Rollers 20, 21 are rotated in the directions indicated, by suitable motor means, not shown.

Apparatus A further comprises means for looping the heating element 16 taken from drum 16A. To this end, a carriage 25 is mounted for transverse movement with respect to the longitudinal path of element 16, on a base member 26. Carriage 25 includes a centrally located feeder 27 for passing the element back and forth with respect to the looping mechanism generally indicated at 28.

The looping mechanism 28 comprises a pair of parallel endless belts 30 suitably mounted in a frame 31 for movement in vertical planes. A series of longitudinally spaced discs 32 are mounted on belts 30. The movements of carriage 25 and belts 30 are intermittent and controlled through suitable programmed control means generally indicated at 33. An electromagnetic coupling 35 coupled to an electric motor 36 by way of an intermediate drive 37 interrupts the power transmission from motor 36 to belts 30.

The carriage 25 in its traversing movements on rails, not shown, brings the element 16 to a position where an advancing disc 32 carried on belts 30 engages the element and reverse movement of carriage 25 brings an extended portion of element 16 to a position for engagement by a disc 23 on the other belt 30. Thus, with timed and programmed movement of belts 30 and carriage 25, the element 16 is formed into the looped structure indicated in FIGS. 1, 2.

Means is provided for rendering the looped portions taut as they are formed by carriage 25 and discs 32. To this end, discs 32 are movably mounted on belts 30. As shown in FIG. 6, belts 30 comprise longitudinally spaced carriages 40, which are interconnected by suitable means, not shown. Carriages move on guide rails 41, 42 by way of rollers 43, 44.

Discs 32 are mounted on crank arms 45 which are in turn mounted on carriages 25. Rollers 46 mounted on crank portions portions 47 bear against camming bars 48 having tapered edge portions 49, straight portions 50 and tapered edge portions 51 on the outlet end.

It will be apparent that with forward movement of carriages 40, crank arms 45 are turned by rollers 46 to move discs 32 outwardly by the distance X. This renders loops 12, 13 taut; showing in FIG. 6 being repeated on the other side of the apparatus A. At the outlet end of camming bars 48, discs 32 are moved inwardly to thereby release the discs 32 from the formed loops 12, 13. The distance X may be regulated by shifting camming bars 48 as indicated by the double arrow B; screws 53 in slots 54 fixing the position of bars 48 on the frame of the apparatus.

The width of the heating mat 10, produced on apparatus A may be varied by shifting the position of one of the belts 30 with respect to the other. Thus, as shown in FIG. 5, the shafts 56, 57 which carry the wheels 58, 59 on which belts 30 are mounted; comprise telescopic portions which are in threaded engagement. Thus, by turning hand wheels 60 in one direction or the other, the effective spacing between belts 30 is adjusted, thereby setting the width of the mat.

The spacing between the parallel portions 11 of mat 10 may also be varied by using discs 32 of different diamaters and by shifting their relative positions, on belts 30.

Means is provided for locking the loops of mat 10 in their spaced relation. To this end, the metal tapes 14, 15 are secured together in their overlying relation; the mat portions 11 being located in tape recessesby suitable welding means 61 movably mounted on a fixed cross member 62. Pneumatic means, not shown, activates the electrodes of welding means 61 to an operative position to weld overling tape portions 14, 15; such movements being controllably timed as the belts 30 in their intermitten movements to advance the mat 10 as it is being formed.

It is understood that the metal tapes 14, 15 may be secured together by alternative means such as adhesive or by riveting.

It will be apparent that apparatus A is effective to form mat 10 in continuous length, which is wound on a 65. Such mat will have its parallel element portions 11 in uniformly spaced relation to each other and the width of the mat will also be uniform throughout its longitudinal extent. Obviously, the extended length of mat may be transversely cut to provide individual mats of desired length.

The electrical heating element 16 may be of the conventional copper-nickel wire enclosed in an insulation of TEFLON (polytetrafluoroethylene) and rubber. Such element may be further encased in a corrugated metal sheath. The ends of element 11 of each mat 10 is provided with suitable terminals, not shown, for connection to a current source.

It is understood that control means 33 is operated in a manner to coordinate the several intermittently operated elements including carriage 25, belts 30, welding means 61; as well as the reel or drum 16A, drum 65. Thus, the tensioning of loops 12, 13 by movable discs 32, takes place before the welding of tapes 14, 15 by welding means 61.

Suitable drive or operating means, in the form of electric motors or hydraulic devices, not shown, are provided for operating the carriage 25, belts 30, welding means 61, drums 16A, 15A, 65, 17 and devices 18, 19.

We claim:

1. Apparatus for continuously forming electrical matting from continuous linear electrical heating element comprising a pair of spaced endless belts arranged with their upper runs in horizontal coplanar relation, means for driving said belts in a longitudinal path, longitudinally spaced looping elements on said belts, carriage means for transversely traversing said belts, means on said carriage for feeding said heating element, means for controlling the movements of said belts and said element feeding means to thereby loop said heating element on said looping elements to provide transversely extending and longitudinally spaced portions of said heating element between the looped portions thereof, means for feeding a pair of vertically aligned tapes longitudinally of said transversely extending heating element portions with one of said tapes disposed above said transversely extending heating element portions and the other of said tapes disposed beneath said transversely extending heating element portions, and means for securing opposed tape portions together which extend between successive transversely extending heating element portions.

2. Apparatus as in claim 1 and further including means for guiding the movement of said looping elements between positions toward and away from each other.

3. Apparatus as in claim 1, and further including means for crimping one of said pair of tapes at spaced points along the length thereof.

4. Apparatus as in claim 1 and further including means for adjusting the spacing of one of said endless belts with respect to the other endless belts.

5. Apparatus as in claim 1 wherein said securing means comprises welding means movably mounted between raised inoperative positions and lowered operative positions.

6. Apparatus as in claim 1, wherein said looping elements comprise discs mounted on vertical axes on said belts.

7. Apparatus as in claim 6, and further including means for adjusting the position of said discs on said belts to adjust the spacing between opposed discs on said belts.

* * * * *